United States Patent
Aggarwal et al.

(10) Patent No.: US 10,877,921 B2
(45) Date of Patent: Dec. 29, 2020

(54) METHODS AND APPARATUS TO EXTEND USB-C SOFTWARE SUPPORT TO NON-USB-C DEVICES

(71) Applicant: Intel Corporation, Santa Clara, CA (US)

(72) Inventors: Nivedita Aggarwal, Bangalore (IN); Reuven Rozic, Binyamina (IL); Amir Levy, Jerusalem (IL); Chia-Hung Kuo, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 851 days.

(21) Appl. No.: 15/209,476

(22) Filed: Jul. 13, 2016

(65) Prior Publication Data

US 2017/0351502 A1 Dec. 7, 2017

(30) Foreign Application Priority Data

Jun. 1, 2016 (IN) .............................. 201641018803

(51) Int. Cl.
*G06F 13/42* (2006.01)
*G06F 9/4401* (2018.01)

(52) U.S. Cl.
CPC ........ *G06F 13/4282* (2013.01); *G06F 9/4411* (2013.01)

(58) Field of Classification Search
CPC .................... G06F 13/4282; G06F 9/4411
See application file for complete search history.

(56) References Cited

U.S. PATENT DOCUMENTS

| | | | | |
|---|---|---|---|---|
| 5,925,134 A | * | 7/1999 | Solomon | G06F 1/3215 713/324 |
| 6,202,147 B1 | * | 3/2001 | Slaughter | G06F 9/5016 711/170 |
| 7,107,044 B1 | * | 9/2006 | Zaidi | G06F 15/167 455/412.1 |
| 10,191,864 B1 | * | 1/2019 | Bshara | G06F 13/105 |
| 2006/0248526 A1 | * | 11/2006 | Rostampour | G06F 9/45504 718/1 |
| 2007/0088857 A1 | * | 4/2007 | Schluessler | G06F 21/53 710/8 |
| 2011/0173351 A1 | * | 7/2011 | Aull | G06F 9/544 710/8 |
| 2017/0272427 A1 | * | 9/2017 | Robison | H04L 63/0853 |

* cited by examiner

*Primary Examiner* — Eric T Oberly
(74) *Attorney, Agent, or Firm* — Hanley, Flight and Zimmerman, LLC

(57) ABSTRACT

Methods, apparatus, systems and articles of manufacture are disclosed to facilitate communication with electronic devices supported by an interface specification and electronic devices unsupported by the interface specification. An example apparatus includes a first firmware interface to facilitate communication between an operating system and a first electronic device, the first electronic device supported in an interface specification. The example apparatus includes a second firmware interface instantiated to facilitate communication with a second electronic device that is not supported in the interface specification, the second firmware interface configured to communicate with the first firmware interface to route communication between the operating system and the second electronic device via the first firmware interface and the second firmware interface.

26 Claims, 10 Drawing Sheets

METHODS AND APPARATUS TO EXTEND USB-C SOFTWARE SUPPORT TO NON-USB-C DEVICES

RELATED APPLICATION

This patent claims the benefit of priority from Indian patent application No. 201641018803, filed on Jun. 1, 2016, entitled "METHODS AND APPARATUS TO EXTEND USB-C SOFTWARE SUPPORT TO NON-USB-C DEVICES", which is hereby incorporated by reference herein in its entirety.

FIELD OF THE DISCLOSURE

This disclosure relates generally to electronic device connectors, and, more particularly, to methods and apparatus to extend universal serial bus (USB)-C™ software support to non-USB-C™ devices.

BACKGROUND

Electronic devices connect to and operate with other electronic devices. For example, electronic devices such as computing devices, displays, peripherals, etc., connect to other electronic devices via a connector interface, such as a USB connector. However, many electronic devices must conform to a given interface specification in order to communicate with other conforming electronic devices via a connector interface.

DETAILED DESCRIPTION

Figure 1:
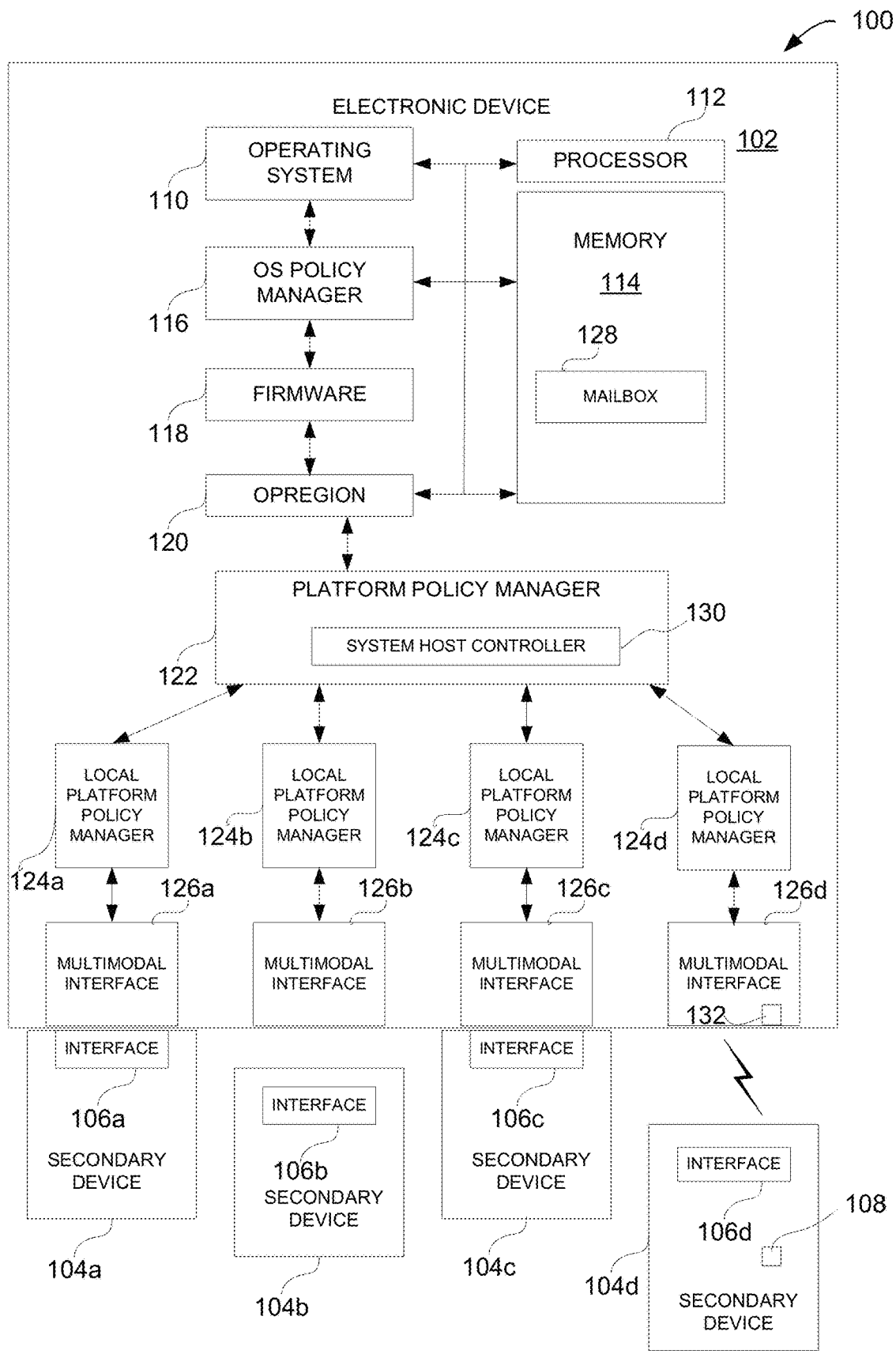
FIG. 1 illustrates an example communication system 100 including a multimodal interface to facilitate communication between electronic devices.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Certain examples provide a communication interface protocol, such as USB-C™ (or USB Type-C™) technology, which drives a streamlined processing platform enabling a plurality of electronic devices over a single connector interface. USB-C™ connectors connect to both electronic hosts and other electronic devices and can replace USB-A and USB-B connectors and cables. For example, a USB-C™ connector can be implemented as a 24-pin, double-sided connector including four power/ground pairs, two differential pairs for non-superspeed data, four pairs for a high-speed data bus, two "sideband use" pins, two configuration pins for cable orientation detection, a dedicated bi-phase mark code configuration data channel, and power for active cables.

In certain examples, a USB-C™-enabled system includes operating system software to report and control devices via a USB-C™ connector. An interface specification, such as the USB-C™ software interface (UCSI) specification defines commands and protocol for communication between software and a connected electronic device through a port controller.

However, given a growing number of peripherals and other electronic devices, it is important to provide systems and methods to support scalable solutions for electronic devices that are not yet part of an interface specification. For example, Thunderbolt™ is a high-speed bus technology that can support multiple inputs and/or outputs (I/Os) at high speed. With the introduction of the USB-C™ connector, performance can be increased and device interoperability can be improved with Thunderbolt™ and USB Type-C™ connection. To enable a common solution across operating systems, certain examples define a firmware-based solution that allows an operating system to interact with USB-C™ device hardware that is not defined in the interface specification. In such examples, the operating system can interact with the hardware using general functions, rather than according to particulars of the interface specification, while still reusing the components of the standard interface.

Alternatively or in addition, a software driver can be developed for the operating system. However, to use the software driver, the operating system needs the capacity to process input from both the standardized and non-standardized interface in parallel. Providing the operating system with the parallel input processing would increase the burden to develop platform-specific and OS-specific solutions, thus negatively impacting time-to-market (TTM) readiness for USB-C™ technology.

While the USB-C™ software interface specification enables a standardized interface for communication between the operating system software and USB-C™ hardware in a platform- and OS-agnostic manner, electronic devices whose configuration is not included in the USB-C™ specification are accommodated by extending usage of existing communication interface(s) outside of the current USB-C™ specification. Certain examples provide a platform policy manager (PPM) corresponding to an electronic device to be supported and a firmware layer that bridges communication to and from an operating system policy manager to the electronic device. The PPM is a second PPM corresponding to the electronic device to be supported and is provided in addition to the primary PPM for the system. Using the second (e.g., device-specific) PPM and firmware layer, access to USB-C™ hardware from the operating system passes through a generic firmware layer, a device-specific firmware layer, and the device-specific PPM before getting a response from the actual hardware. The device-specific PPM and firmware provide an abstraction layer that allows workarounds and bug fixes to be implemented at the platform level without upper level operating system changes. Thus, certain examples provide an enhancement to a USB-C™ connector system software interface (UCSI) specification that can be expanded to future electronic device(s), and changes can eventually be rolled into the USB-C™ specification.

In certain examples, USB-C™ hardware is a connector including detection logic that interacts with a system host controller. An entity that is to understand, control, and/or communicate with another devices via the USB-C™ hardware connector accesses the device through a system host controller and/or a device-specific controller. The system host controller can be part of a system-on-a-chip (SOC), implemented separately on a platform, concealed by other system host controller(s) (e.g., embedded controller (EC), integrated sensor hub (ISH), etc.), etc. For a device that is not supported by a current implementation of the interface specification, the system host controller may also be a device-specific driver (also referred to as a second PPM or device-specific PPM).

As described above, an operating system can access USB-C™ hardware through a generic firmware interface. The generic firmware interface interacts with a platform policy manager (PPM), which facilitates physical communication with a local policy manager (LPM) that is connected to the USB-C™ hardware. Communication between the operating system and the USB-C™ hardware follows a specific protocol defined in the UCSI specification.

However, for devices that are currently not part of the UCSI specification, an additional communication mechanism that can reuse and align with the UCSI communication interface is provided. The alternative communication interface mechanism includes an additional PPM component that is specific to the new USB-C™ device and a firmware layer that can communicate between the existing software interface and the second PPM.

FIG. 1 illustrates an example communication system 100 including a multimodal interface to facilitate communication between electronic devices. The example communication system 100 includes a first electronic device 102 and one or more secondary devices 104a-104d. Each secondary device 104a-d includes an interface 106a-106d, respectively. In an example, one or more secondary devices 104a-d includes a wireless interface to enable wireless communications. For example, secondary device 104d is illustrated in FIG. 1 as including a wireless module 108.

The electronic device 102 of the example of FIG. 1 includes an operating system (OS) 110, a processor 112, a memory 114, an OS policy manager (OPM) 116, firmware 118, an operation region (Opregion) 120, a platform policy manager (PPM) 122, one or more local policy platform managers (LPM) 124a-124d, and one or more multimodal interfaces 126a-126d. The example memory 114 can include a mailbox 128, for example. The example mailbox 128 may be implemented as a buffer in the memory 114, for example. The example PPM 122 can include a system host controller 130.

In certain examples, one or more multimodal interfaces 126a-126d can include a wireless interface to enable wireless communications. For example, multimodal interface 126d is illustrated as including a wireless interface 132. In another example, the wireless interface 132 is included in the electronic device 102 and its resources can be shared by a plurality of the multimodal interfaces 126a-d. The secondary device 106d can be in wireless communication with the electronic device 102 using the wireless interfaces 108 and 132.

In certain examples, each multimodal interface 126a-126d can be associated with a corresponding LPM 124a-124d. For example, multimodal interface 126a may correspond to LPM 124a; multimodal interface 126b may correspond to LPM 124b; multimodal interface 126c may correspond to LPM 124c, and multimodal interface 126d may correspond to LPM 124d. Each multimodal interface 126a-126d can support power transfers, directionality, and multiple input/output (I/O) protocols on the same interface. The multiple protocols may be automatically configured to run simultaneously or separately on the respective multimodal interface or connector 126a-d without user intervention. For example, each secondary device 104a-104d can be a different electronic device (e.g., a data communication device, I/O device, storage device, etc.) and multimodal interface 126a (or multimodal interfaces 126b-d) may support each different secondary device 104a-d.

In certain examples, the communication system 100 of FIG. 1 may be configured to communicate via a transmission control protocol/Internet protocol (TCP/IP) to transmit and/or receive packets in a network. The example communication system 100 may also operate in conjunction with a user datagram protocol/IP (UDP/IP) and/or any other suitable protocol, where appropriate. The multimodal interfaces 126a-d allow the electronic device 102 to connect to and communicate with a plurality of secondary devices 104a-d via a single connector configured to support multiple functions on a platform independent of OS or I/O protocol. To enable a common solution across operating systems, a generic firmware-based interface is provided that allows an OS to interact with different types of hardware needs to be defined.

In communication system 100 of FIG. 1, one or more multimodal interface 126a-126d is a multimodal interface or connector that can support power transfers, directionality, and/or multiple I/O protocols on the same interface or connector 126a-d, for example. Multiple protocols can be automatically configured to run simultaneously and/or individually on the multimodal interface 126a-d without user intervention. The example communication system 100 can include a set of data structures, commands, notifications, and state transitions (e.g., software and/or hardware) to efficiently configure and operate a platform with one or more multimodal interfaces or connectors 126a-d. The example communication system 100 can also communicate the capabilities of a platform to an OS that implements multimodal interfaces 126a-d. I/O protocols can be configured to operate over the same or different pins on a multimodal interface 126a-d, for example.

Further, interfacing with the communication system 100 can be defined agnostic to an OS (e.g., Android™, iOS™, Linux™, OSX™ Windows™, etc.) and/or I/O interconnect (e.g., ACPI™, I2C™, I2S™ PCIe™, etc.) platform. As a result, hardware component designers, system builders, and device driver (e.g., software) developers can develop platforms with multimodal interfaces 126a-d that seamlessly interoperate with one another. For example, the PPM 122 can include a combination of hardware, firmware and a vendor provided OS support software to provide an interface to the multimodal interfaces 126a-d on the platform. A specific interface (e.g., PCIe, ACPI, I2C, etc.) is not required in order to interface with PPM 122. In addition, the interface between OPM 116 and PPM 122 is defined to be easily implemented using any of the above mentioned interconnects or other interconnect not mentioned above.

Using the example PPM 122 and OPM 116, the communication system 100 can define a generic firmware-based interface that abstracts the underlying hardware (e.g., USB Type-C™ hardware), allowing the OS 110 to access the hardware without knowing and understanding its specifications or intricacies. The OPM 116 is an interaction layer from the OS 110 that abstracts the underlying platform specific hardware and platform agent that performs actual physical transactions with the hardware. Access to the hardware (e.g., secondary devices 104a-104d) from OS 110 begins with OPM 116 and passes through an LPM 124a-d before getting a response from the hardware. The processor 112 is used by the OS 110, OPM 116, firmware 118, etc., to execute software functionality and facilitate communication and interaction between hardware and/or software components of the system 100.

As shown in the example of FIG. 1, firmware 118 may be a firmware-based device policy manager that can be implemented by one or more original equipment manufacturers (OEMs), irrespective of the OS 110 to be supported or a number of specific ports and devices on the platform. The example firmware 118 and PPM 122 can abstract the underlying hardware (e.g., USB Type-C™ hardware, etc.) from the OS 110 to interact with the LPM 124a-124d. The example LPM 124a-124d facilitates command level communication with a secondary device (e.g., secondary devices 104a-104d) connected to a multimodal interface (e.g., multimodal interfaces 126a-126d).

In certain examples, each multimodal interface 126a-126d can be implemented as an interface or connector with detection logic that interacts with an LPM 124a-124d, respectively. The example electronic device 102 can understand, control, or communicate with one or more secondary devices 104a-104d through a connected LPM 124a-124d, for example. Each LPM 124a-124d can physically be part of a system-on-a-chip (SOC) or separately on a platform concealed by other micro controllers (e.g., an embedded controller or an integrated sensor hub), for example. The PPM 122 provides an abstraction layer which enables future workarounds and bug fixes to be implemented at a platform level without upper layer changes such as OS layer changes.

In the example of FIG. 1, the OPM 116 is primarily responsible for communicating, to firmware 118, any OS 110 based requests to secondary devices 104a-104d and vice versa. Firmware 118 can abstract the underlying hardware from the OS 110 and OPM 116 by interacting with the PPM 122. The example PPM 122 is a platform specific component that maintains platform and system level information for secondary devices 104a-104d and directly communicates with the one or more LPMs 124a-124d that manage an individual multimodal interface 126a-126d. The communication mechanism between the OPM 116 and firmware 118 can work with a variety of PPMs 122, for example. Firmware 118 can be implemented in many ways (including ACPI, SMM, etc.) such that firmware 118 can enable runtime communication with the OPM 116.

In certain examples, communication between the OPM 116 and PPM 122 may go through the mailbox 128. The mailbox 128 can be a shared buffer in memory 114 and/or another location in a memory 114 of the electronic device 102. The example mailbox 128 can be a shared memory generic data structure that is defined in a format that is based on interface specification registers for secondary devices 104a-104d which describes the registers and pattern of access to secondary devices 104a-104d, for example. In a specific example, the mailbox 128 can be shared memory that is defined in a format that is based on the USB Type C Software Interface specification registers which describe the registers and pattern of access to Type C hardware. In certain examples, the OS 110, processor 112, OPM 116, and/or firmware 118 can utilize the mailbox 128 and Opregion 120 for temporary storage and/or exchange of data and messages, for example.

In certain examples, to avoid a possible race condition between two successive commands from the OS 110 and a secondary device (e.g., secondary devices 104a-104d), when the communication between OS 110 and the secondary device is two way, the mailbox 128 can be partitioned into two regions, each accessible only to either the firmware 118 or OPM 116. For example, the mailbox 128 can be partitioned into a command area and a response area. In an example, OPM 116 can write a request or command from the OS 110 to a secondary device 104a-d in an OPM 116 portion of the mailbox 128. The PPM 122 can read the mailbox 128 to receive the request or command from the OPM 116. If there is a communication alert from the secondary device 104a-d to the OPM 116, the example PPM 122 can update a response area of the mailbox 128 and alert the OPM 116, which then reads the mailbox 128 to process the cause for the alert.

In certain examples, the system host controller 130 may be an EC (Client Systems), BM controller (Server systems), I2C controller (Tablet systems), ISH (long term possible solution), or some other similar system that facilitates communications to and from the PPM 122. The firmware 118 can establish an Opregion 120 for a communication channel that is irrespective of the type of PPM 122. For example, when there is a request detected from OPM 116, the firmware 118 can update the Opregion 120 with the request and alert the PPM 122. The PPM 122 can retrieve the request, process it, and communicate the request to a secondary device 104a-d using an LPM 124a-d and interface connected to the secondary device 104a-d. Similarly, a request from the secondary device 104a-d (or interface or LPM 124a-d) is first updated in Opregion 120 by the PPM 124 before the firmware 118 writes the request to the mailbox 128.

In a specific example, when the OPM 116 is in an idle state, the OPM 116 may be waiting for a notification from the OS 110, PPM 122, or another element in the system 100. From the idle state, the OPM 116 may send a command and enter into a wait for command completion state. For example, OPM 116 may send a connector status update command to the PPM 122 and wait for a response from the PPM 122. If the command is a reset PPM command, then the command may result in notifications being disabled from the OPM 116, and the PPM 122 can send a reset indicator to indicate the reset command was received.

While in the wait for command completion state, if the PPM 122 responds with a busy indicator, the OPM 116 can delay completion of the command and a return to wait for command competition state. If the PPM 122 responds with a busy indicator and OPM 116 determines that the command is to be canceled, the OPM 116 can enter into a cancel present command intermediate state, send a cancel command message, and return to a wait for command competition state.

From the idle state, the OPM 116 also may wait for a notification, in which case the OPM 116 remains in the idle state. If a connector change pending indication is set, then the OPM 116 may enter into an OPM process connector change intermediate state. From the OPM process connector change intermediate state, the OPM 116 can send an associated command and enter into an OPM wait for command completion state or acknowledge the connector change, send an acknowledgement command, and enter into a wait for acknowledge command indicator state. After the PPM 122 has sent an acknowledgement command indicator to indicate the connector change has been completed, the PPM 122 can move from the OPM wait for acknowledge command indicator state to the idle state.

In certain examples, using communication system 100, an OS vendor can correctly interoperate with a system that supports multimodal interfaces or connectors such as multimodal interfaces 126a-126d. Such interoperability can allow OS vendors and operating hardware vendors (OHVs) to develop software and hardware respectively that will interoperate seamlessly. This can enable an original equipment manufacturer (OEM) or an OHV to deliver products to users and produce OS-agnostic standardized hardware that will work seamlessly with various OSs, attached third party peripherals, and even to improve the capability of products to communicate with each other.

As used herein with respect to the infrastructure of FIG. 1, the term "communication" refers to the transfer of data. The term "data", as used herein, refers to any type of binary, numeric, voice, video, textual, or script data, or any type of source or object code, or any other suitable information in any appropriate format that may be communicated from one point to another in electronic devices and/or networks. In an example implementation, the electronic device 102 and secondary devices 104a-104d are electronic elements, which are meant to encompass any suitable hardware, software, components, modules, or objects that facilitate the operations thereof, as well as suitable interfaces for receiving, transmitting, and/or otherwise communicating data or information. This may be inclusive of appropriate algorithms and communication protocols that allow for the effective exchange of data or information.

In the example communication system 100, each of electronic device 102 and secondary devices 104a-104d can include memory elements for storing information to be used in the operations outlined herein. Each of electronic device 102 and secondary devices 104a-104d may keep information in any suitable memory element 114 (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term "memory element." Moreover, the information being used, tracked, sent, or received in communication system 100 can be provided in any database, register, queue, table, cache, control list, or other storage structure, all of which can be referenced at any suitable timeframe. Any such storage options may also be included within the broad term "memory element" as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some examples, memory elements can store data used for the operations described herein. This includes the memory elements being able to store software, logic, code, or processor instructions that are executed to carry out the activities described herein.

In an example implementation, the electronic device 102 and secondary devices 104a-104d may include software modules to achieve and/or facilitate operations such as outlined herein. These modules may be suitably combined in any appropriate manner, which may be based on particular configuration and/or provisioning needs. In some examples, such operations may be carried out by hardware, implemented externally to these elements, or included in some other network device to achieve the intended functionality. Furthermore, the modules can be implemented as software, hardware, firmware, or any suitable combination thereof. These elements may also include software (and/or reciprocating software) that can coordinate with other network elements in order to achieve the operations, as outlined herein.

Additionally, each of electronic device 102 and secondary devices 104a-104d may include a processor (e.g., processor 112) that can execute software or an algorithm to perform activities as discussed herein. A processor can execute any type of instructions associated with the data to achieve the operations detailed herein. In one example, the processor can transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

In certain examples, the electronic device 102 can be an electronic element and includes, for example, desktop computers, laptop computers, mobile devices, personal digital assistants, smartphones, tablets, or other similar devices. Secondary devices 104a-104d may be secondary hardware such as a peripheral that is in communication with the electronic device 102. The term "peripheral" as used herein, is generally defined as any auxiliary device such as a Universal Serial Bus (USB) flash drive, computer mouse, keyboard, speaker, microphone, etc., that connects to and works with an electrical device such as a computer in some way. One or more secondary devices 104a-104d may be the same device or each secondary device 104a-104d may be a different device.

As described above, however, some secondary devices 104a-d are unsupported by the UCSI specification. As described further below, a firmware-based mechanism can be provided to add multiple electronic devices to a USB-C™ connector with reduced delay.

Figure 2:
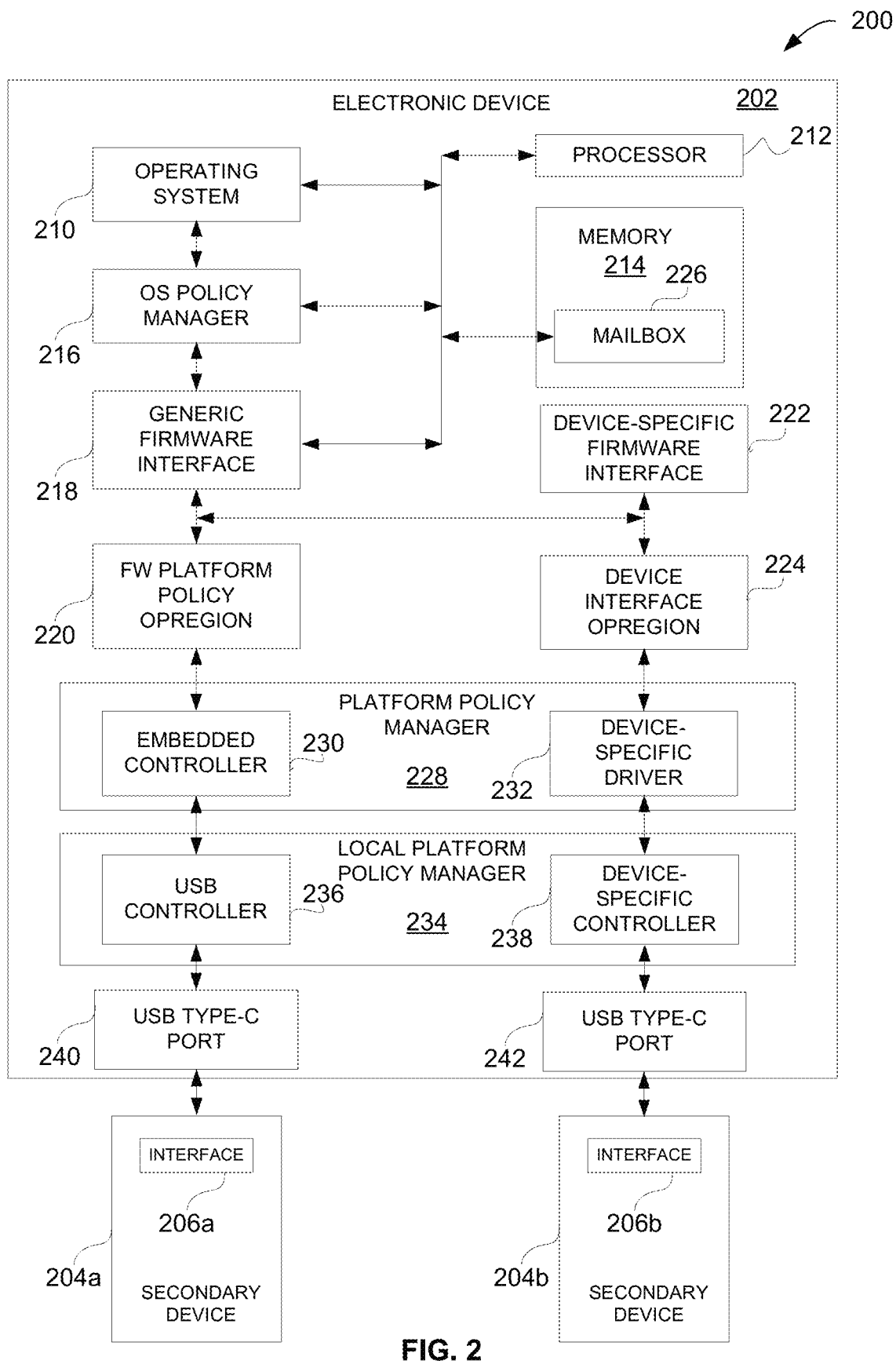
FIG. 2 illustrates an example interface system architecture to facilitate communication between an electronic device, a supported secondary device, and an unsupported electronic device.

FIG. 2 illustrates an example interface system architecture 200 to facilitate USB-C™ communication between an electronic device 202, a secondary device 204a that is supported in the USB-C™ interface specification, and an electronic device 204b that is not supported in the USB-C™ interface specification. The electronic device 202 can be a re-configured electronic device 102 and/or a distinct device that can work together and/or separate from the electronic device 102 described above with respect to the example of FIG. 1. Similarly, the secondary devices 204a and/or 204b can be the same as, similar to, and/or distinct from the secondary devices 104a-104d described above with respect to FIG. 1.

The example system 200 includes an operating system (OS) 210, a processor 212, a memory 214, an OS policy manager (OPM) 216, a generic firmware (FW) interface 218, and a FW platform policy operation region (Opregion) 220. The example system 200 also includes a device-specific FW interface 222 and a device interface Opregion 224. The memory 214 can include a mailbox 226 for storage of messages, data, etc.

As shown in the example of FIG. 2, while the generic FW interface 218 communicates with the FW platform policy Opregion 220, the device specific FW interface 222 communicates with the device interface Opregion 224. The example Opregions 220, 224 communicate with a platform policy manager (PPM) 228. The example PPM 145 includes an embedded controller 230 and a device specific driver 232. Additionally, the example system 200 includes a local policy manager (LPM) 234. The example LPM 234 includes a USB controller 236 and a device-specific controller 238. As shown in the example of FIG. 2, each component of the LPM 234 interfaces with a USB Type-C™ port 240, 242, which can be used to communicate with a secondary device 204a, 204b via an interface 206a, 206b associated with the secondary device 204a-b.

In the example of FIG. 2, the OPM 216 identifies and interacts with the generic FW interface 218 to communicate OS-based requests to and from a USB-C™ connector/device via the USB-C™ port(s) 240, 242. The generic firmware interface 218 abstracts underlying hardware from the OS 210 and OPM 216 by interacting with the platform policy manager 228.

The example PPM 228 is a platform-specific component that maintains platform- and system-level information for USB-C™ connectors/ports 240, 242. The PPM 228 directly communicates with one or multiple local policy manager(s) (LPM) 234 that manage USB Type-C™ connectors 240, 242 on the platform 200.

As shown in the example of FIG. 2, the device-specific FW interface 222 provides support for electronic devices falling outside of the USB-C™ interface specification. Without the device-specific FW interface 222, such devices would be unable to communicate via the USB-C port 242. The device-specific firmware interface 222 communicates with the device-specific driver 232 in the PPM 228, which in turn interacts with the USB-C™ hardware device via the device-specific controller 238 of the LPM 234. The device-specific FW interface 222 communicates with the OPM 216 through the generic firmware interface 218. In certain examples, the device-specific firmware interface 222 is constructed for a particular device and/or type of device that is unsupported by an interface specification used by the generic firmware interface 218 to communicate with supported electronic devices.

In the example platform 200 of FIG. 2, the mailbox 226 is defined for communication between the OPM 216 and the generic firmware interface 218. In operation, for example, the OPM 216 writes a control command and associated message in the mailbox 226 and calls the generic firmware interface 218 for execution. The generic firmware interface 218 reads the mailbox 226 to receive the OPM 216 request. The generic firmware interface 218 establishes an Opregion-based communication channel 220 with the platform policy manager 228. When a request is detected from the OPM 216, the firmware 218 updates the Opregion 220 with information associated with the request and alerts the PPM 228. The PPM 228, in turn, using its embedded controller 230, consumes the information in the Opregion 220, interprets the information, and communicates the information to the corresponding USB-C™ controller 236 in the LPM 234. Similarly, an alert from the USB-C™ controller 236 is updated in the Opregion 220 by the PPM 228 before the firmware 218 copies the alert into the mailbox 226 for the OPM 216.

To support devices in addition to devices described in the USB-C™ interface specification, an additional PPM 228 component (the device-specific driver 232) and the device-specific firmware component 222 are provided in the example electronic device 202. The device-specific driver 232 of the PPM 228 interacts with the device-specific controller 238 of the LPM 234, passing the commands and responses to and from the OPM 216 via the device-specific firmware interface 222 in communication with the generic firmware interface 218.

Thus, the device-specific firmware interface layer 222 acts as a bridge between the generic firmware interface layer 218 and the device-specific PPM 232. The flexibility to access a different USB hardware interface is provided in the device-specific firmware 222, and the device-specific firmware 222 is utilized to build communication between the additional "unsupported" electronic device 204b and the software communication channel provided by the generic firmware 218, OPM 216 and OS 210. The device-specific firmware 222 can be implemented in a variety of ways, including according to the Advanced Configuration and Power Interface (ACPI) specification, System Management Mode (SMM), etc., such that the firmware 222 can enable runtime communication with the OPM 216 as well as the device-specific driver 232. The device-specific driver 232 and firmware interface 222 can be defined for a specific unsupported electronic device and/or type of electronic device, for example.

As shown in the example of FIG. 2, the device-specific firmware interface 222 shares an Opregion 224 with the device-specific driver component 232 of the PPM 228. Though the existing PPM 228 shares an Opregion 220 with the generic firmware interface 218, since the FW platform policy Opregion 220 is in a secure memory region, that Opregion 220 cannot be accessed by other drivers 232 or firmware interfaces 222. Thus, the separate device interface Opregion 224 is formed to share commands and data between the device-specific PPM 232 and its corresponding firmware interface 222. The structure of the two Opregions 220, 224 is similar, allowing easy pass-through of data between the two firmware interfaces 218, 222.

Communication between the device-specific firmware interface 224 and the OPM 216 is facilitated by the generic FW interface 218. The device-specific firmware interface 222 is defined in the scope of the electronic device 202 and the PPM 228. However, as a firmware component, the device-specific firmware interface 222 can write to the shared mailbox 226 between the generic firmware interface 218 and the OPM 216, make calls corresponding to calls from the generic firmware interface 218, and notify the OPM 216, for example.

Figure 3:
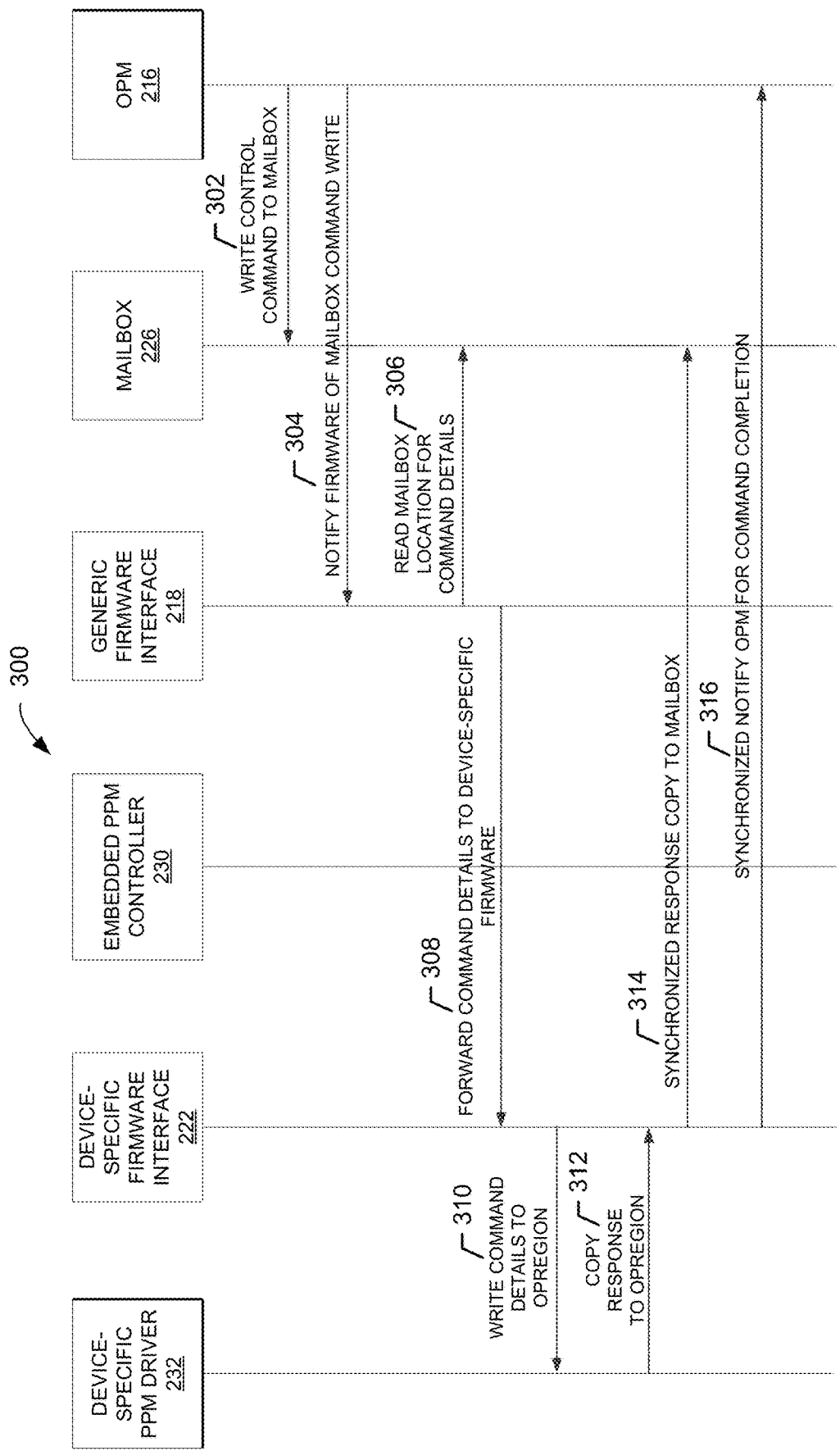
FIG. 3 illustrates an example data flow of communication between an operating system policy manager and a device-specific platform policy manager for upstream communication.

FIG. 3 illustrates an example data flow 300 of communication between the OPM 216 and the device-specific PPM driver 232 for upstream communication. At block 302, when the OPM 216 is to query or control USB-C™ hardware, the OPM 216 places a command request in the shared mailbox 226. In certain examples, an organization of the mailbox 226 and a format of the command are based on the UCSI specification. For example, the command can include a power transfer command, input/output protocol command, data directionality command, audio information, display information, and/or other OS 210 communication with connected hardware 204a-b, for example.

At block 304, after placing the command in the mailbox 226, the OPM 216 invokes the USB-C™ generic firmware interface 218 to read the content of the mailbox 226 and pass the command to the embedded PPM controller 230. At block 306, the generic firmware interface 218 reads a mailbox 226 location specified by the OPM 216 to identify the stored command. The generic firmware 218 can copy the command to the FW platform policy opregion 220 and invoke the embedded PPM controller 230 (e.g., the embedded controller 230 of the PPM 228) to read the content of the opregion 220 and process the command. In certain examples, the FW platform policy opregion 220 is arranged as the mailbox 226 is laid out. The similar layout allows the generic firmware interface 218 to relay the command information without much processing.

At block 308, the generic firmware interface 218 invokes the device-specific firmware interface 222 to copy the command into the device interface opregion 224 shared with the second PPM (the device-specific driver 232 of the PPM 228). At block 310, the device-specific firmware interface 222 then notifies the device-specific PPM driver 232 of an opregion 224 write. Thus, in certain examples, the command can be written into both the FW platform policy opregion 220 and the device-specific opregion 224 by the generic firmware interface 218 and the device-specific firmware interface 220, respectively, for access by the embedded controller 230 and device-specific driver 232, respectively, of the PPM 228. The device-specific PPM driver 232, similar to the embedded controller 230, processes the command based on the ports and devices under its control. At block 312, the device-specific PPM driver 232 copies a response to the command to the device-specific opregion 224.

At block 314, the device-specific firmware interface 222 places a copy of the response from the opregion 224 into the mailbox 226. At block 316, the device-specific firmware interface 222 notifies the OPM 216 that execution of the command has been completed. If the embedded PPM controller 230 is also tracking execution of the command at a compliant device, the generic firmware interface 218 can also notifies the OPM 216 that execution of the command has been completed. The OPM 216 can retrieve the response(s) indicating completion of the command from the mailbox 226, for example.

To prevent a possible race condition occurring during upstream communication, in which both PPM 228 components 230, 232 are updating the OPM mailbox 226 at the same time, both firmware interfaces (generic 218 and device specific 222) are synchronized (e.g., using internal counters) to update the mailbox 226 one at a time. Thus, transmitting the response copy from the generic 218 and device-specific 222 firmware interfaces to the mailbox 226 can be synchronized (e.g., using a counter to alternate between the firmware interfaces 218, 222) to avoid duplicative, simultaneous updating, for example. Similarly, notifying the OPM 216 of command completion can be synchronized by the generic FW interface 218 and the device-specific FW interface 222 using a counter.

Figure 4:
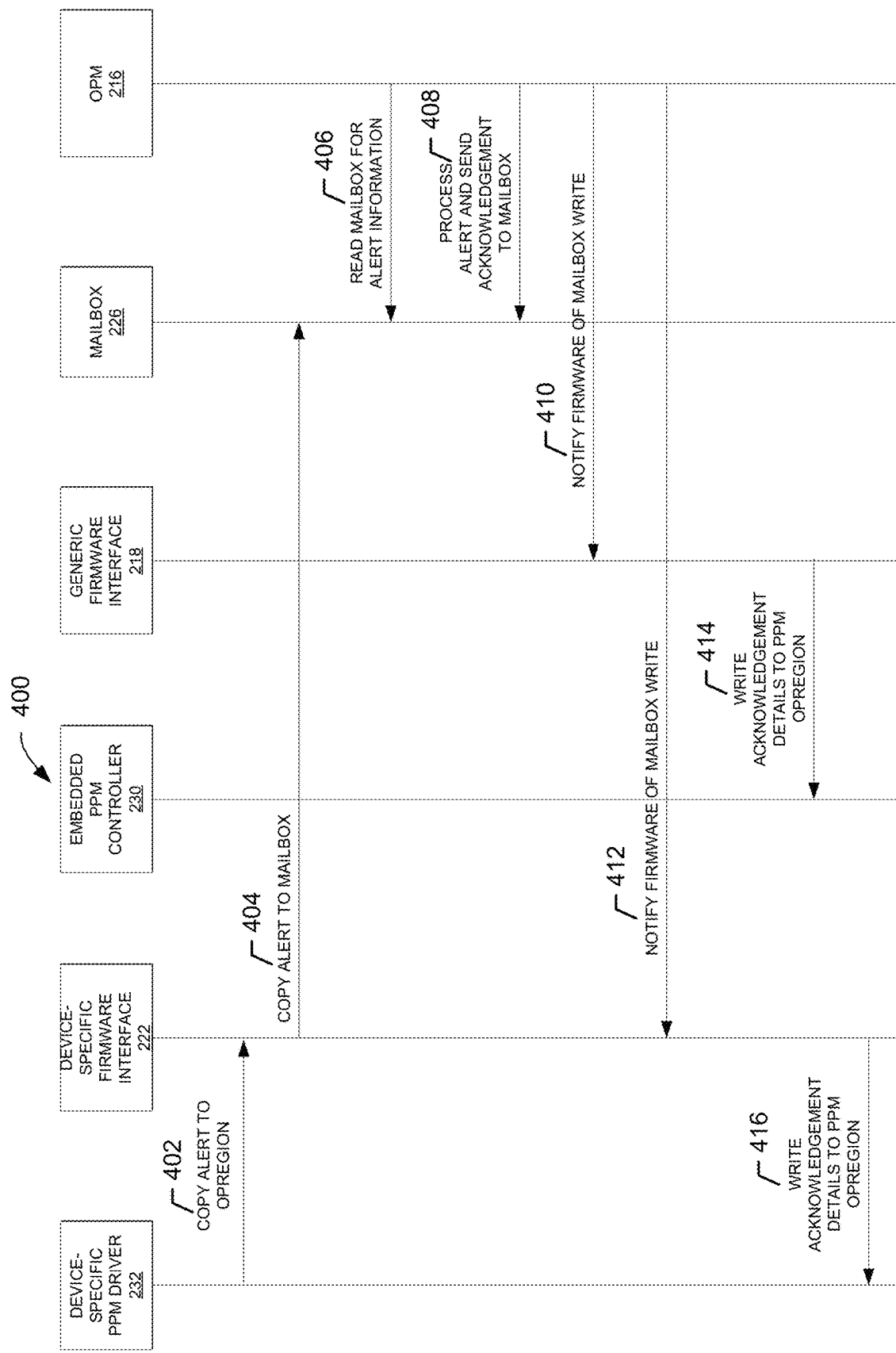
FIG. 4 illustrates an example data flow of downstream communication between the device-specific platform policy manager and the operating system policy manager.

FIG. 4 illustrates an example data flow 400 of downstream communication between the device-specific PPM driver 232 (e.g., for USB-C™ hardware, etc.) and the OPM 216. In the case of a communication from the USB-C™ hardware to the OPM 216, the device-specific PPM driver 232 corresponding to the secondary device 204b is the first to receive the communication from the device 204b hardware (e.g., from the communication interface 206b). Communication can include a set of data structures, commands, notifications, and state transitions (software and/or hardware) to efficiently configure and operate a platform with one or more multimodal interfaces and/or connectors. Commands can include connector reset, connector command completion, connector change indication, get connector capability, get connector status, set USB operation role, power direction change, set power direction role, etc.

At block 402, the device-specific PPM driver 232 conveys information (e.g., an alert notification related to a command, etc.) to the device-specific firmware interface 222 by placing the alert in the device interface Opregion 224 and calling the firmware 222 to process the alert. At block 404, the device-specific firmware interface 222 copies (e.g., via the generic firmware interface 218) the alert from the opregion 224 to the mailbox 226.

At block 406, the device-specific firmware 222 notifies (e.g., via the generic firmware interface 218) the OPM 216 that a message has been left in the mailbox 226. The OPM 216 can then retrieve and process the alert(s).

In certain examples, the embedded PPM controller 230 can also copy an alert to its PPM opregion 220. In such examples, the generic firmware interface 218 copies the alert from the opregion 220 to the mailbox 226 and notifies the OPM 216 that a message has been left in the mailbox 226.

Since a race condition can develop during downstream communication when both the PPM components 230, 232 are updating the OPM mailbox 226 at the same time, both the firmware interfaces (generic 218 and device specific 222) are synchronized (e.g., using internal counters) to update the mailbox 226 one at a time.

At block 406, the OPM 216 reads the mailbox 226 to locate and process the alert information saved in the mailbox by the firmware interface(s) 218, 222. At block 408, the OPM 216 processes the alert and sends an acknowledgement to the mailbox 226.

At block 410, the OPM 216 notifies the generic firmware interface 218 that the OPM 216 has written the acknowledgement of the processing of the alert to the mailbox 226. At block 412, the OPM 216 notifies the device-specific firmware interface 222 (e.g., via the generic firmware interface 218) that the OPM 216 has written the acknowledgment of the processing of the alert to the mailbox 226.

At block 414, the generic firmware interface 218 writes acknowledgement details from the mailbox 226 to the platform policy opregion 220. At block 416, the device-specific firmware interface 222 writes the acknowledgement details from the mailbox 226 to the device interface opregion 224.

While example implementations of the systems 100, 200 and system data flow 300, 400 are illustrated in FIGS. 1-4, one or more of the elements, processes and/or devices illustrated in FIGS. 1-4 may be combined, divided, re-arranged, omitted, eliminated and/or implemented in any other way. Further, the example OS 110, 210, processor 112, 212, memory 114, 214, OPM 116, 216, firmware interface 118, 218, 222, opregion 120, 220, 224, PPM 122, 228, LPM 124a-d, 234, interface 126a-d, 240, 244, and/or, more generally, the example systems 100, 200, 300, and/or 400 of FIGS. 1-4, may be implemented by hardware, software, firmware and/or any combination of hardware, software and/or firmware. Thus, for example, any of the example OS 110, 210, processor 112, 212, memory 114, 214, OPM 116, 216, firmware interface 118, 218, 222, opregion 120, 220, 224, PPM 122, 228, LPM 124a-d, 234, interface 126a-d, 240, 244, and/or, more generally, the example systems 100, 200, 300, and/or 400 of FIGS. 1-4 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example OS 110, 210, processor 112, 212, memory 114, 214, OPM 116, 216, firmware interface 118, 218, 222, opregion 120, 220, 224, PPM 122, 228, LPM 124a-d, 234, interface 126a-d, 240, 244, and/or, more generally, the example systems 100, 200, 300, and/or 400 of FIGS. 1-4 is/are hereby expressly defined to include a tangible computer readable storage device or storage disk such as a memory (e.g., a read only memory (ROM), hard drive, flash memory, other volatile and/or non-volatile memory, etc.), a digital versatile disk (DVD), a compact disk (CD), a Blu-ray disk, etc. storing the software and/or firmware. Further still, the example systems of FIGS. 1-4 may include one or more elements, processes and/or devices in addition to, or instead of, those illustrated in FIGS. 1-4, and/or may include more than one of any or all of the illustrated elements, processes and devices.

Flowcharts representative of example machine readable instructions for implementing the systems 100, 200, 300, and/or 400 of FIGS. 1-4 are shown in FIGS. 5-9. In these examples, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 5-9, many other methods of implementing the example systems 100, 200, 300, and/or 400 may alternatively be used. For example, the order of execution of the blocks may be changed, and/or some of the blocks described may be changed, eliminated, or combined.

As mentioned above, the example processes of FIGS. 5-9 may be implemented using coded instructions (e.g., computer and/or machine readable instructions) stored on a tangible computer readable storage medium such as a hard disk drive, a flash memory, a ROM, a CD, a DVD, a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
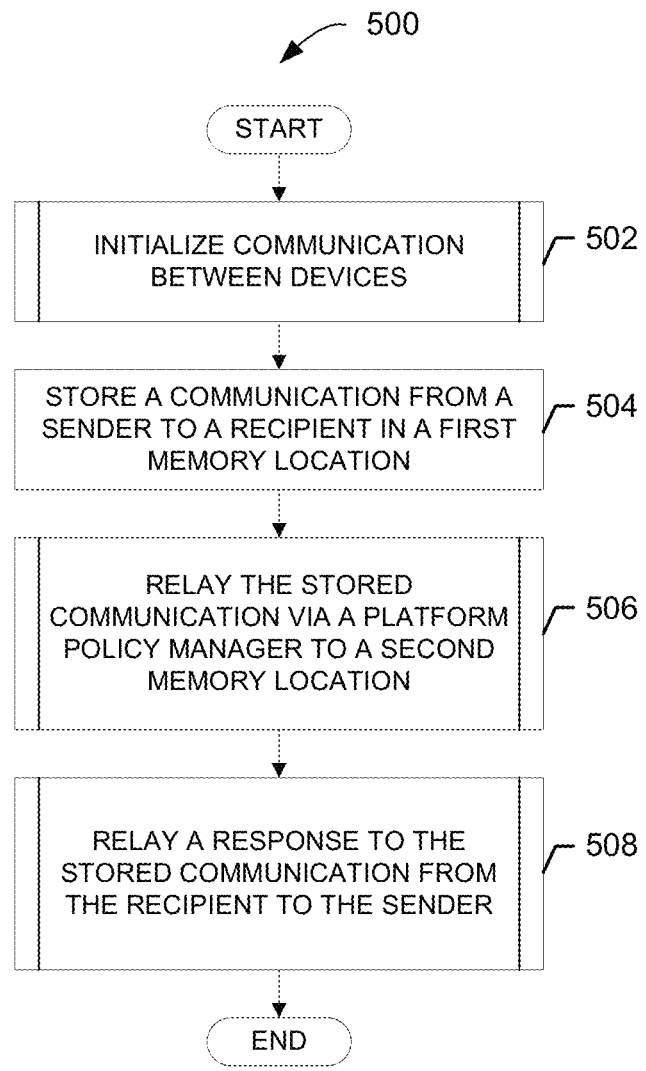
FIGS. 5-9 are flowcharts representative of example machine readable instructions that may be executed to implement the example systems of FIGS. 1-4.

FIG. 5 illustrates a flow diagram of an example method 500 to exchange communications between a sender and a recipient via an electronic device interface connection. The program 500 of FIG. 5 begins at block 502, at which communication between devices 202 and 204a-204b is initialized. For example, communication between the OPM 216 and the secondary device 204a-204b is initialized to allow the OS 210 to determine platform 202 capability, connected device(s) 204a-204b, connected device(s) 204a-204b capability, etc. After communication is initialized, a sender (e.g., the secondary device 204a-204b, the OPM 216, etc.) knows how to communication with a recipient (e.g., the secondary device 204a-204b, the OPM 216, etc.). For example, the OPM 216 and OS 210 know whether the connected secondary device(s) 204a-204b are supported or unsupported by the UCSI.

At block 504, a communication from the sender (e.g., the secondary device 204a-204b, the OPM 216, etc.) to the recipient (e.g., the secondary device 204a-204b, the OPM 216, etc.) is stored in a first memory location. For example, a communication (e.g., a command, notification, data, etc.) from the OPM 216 to a connected secondary device 204a and/or 204b is saved in the mailbox 226. As another example, a communication (e.g., a command, notification, data, etc.) from the connected secondary device 204a and/or 204b to the OPM 216 is saved in the opregion 220 and/or 224. In certain examples, a notification is generated when the communication is saved at the first location (e.g., a notification to and/or from the OPM 216, firmware interface 218 and/or 222, PPM 228, etc., regarding the stored communication).

At block 506, the stored communication is relayed via the PPM 228 to a second memory location. For example, the PPM 228 and/or associated firmware 218, 222 moves the stored communication from the opregion 220, 224 to the mailbox 226 or from the mailbox 226 to the opregion 220, 224 depending upon the designated sender and recipient. In certain examples, a notification is generated when the communication is saved at the second location (e.g., a notification to and/or from the OPM 216, firmware interface 218 and/or 222, PPM 228, etc., regarding the stored communication). The notification can trigger the recipient to access the stored communication. For example, the PPM 228 can communicate the stored communication from the opregion 220, 224 to the secondary device 204a, 204b via the LPM 234 and associated port 240, 242. As another example, the OPM 216 can retrieve the stored communication from the mailbox 226 and process the communication.

At block 508, a response to the stored communication is relayed from a recipient to the sender. For example, the OPM 216 generates an acknowledgement to be transmitted to the secondary device 204a, 204b via the mailbox 226, firmware 218 and/or 222, PPM 228, and opregion 220 and/or 224. As another example, the secondary device 204*a* and/or 204*b* generates a response to be transmitted to the OPM 216 via the PPM 228, opregion 220 and/or 224, firmware 218 and/or 222, and mailbox 226.

Figure 6:
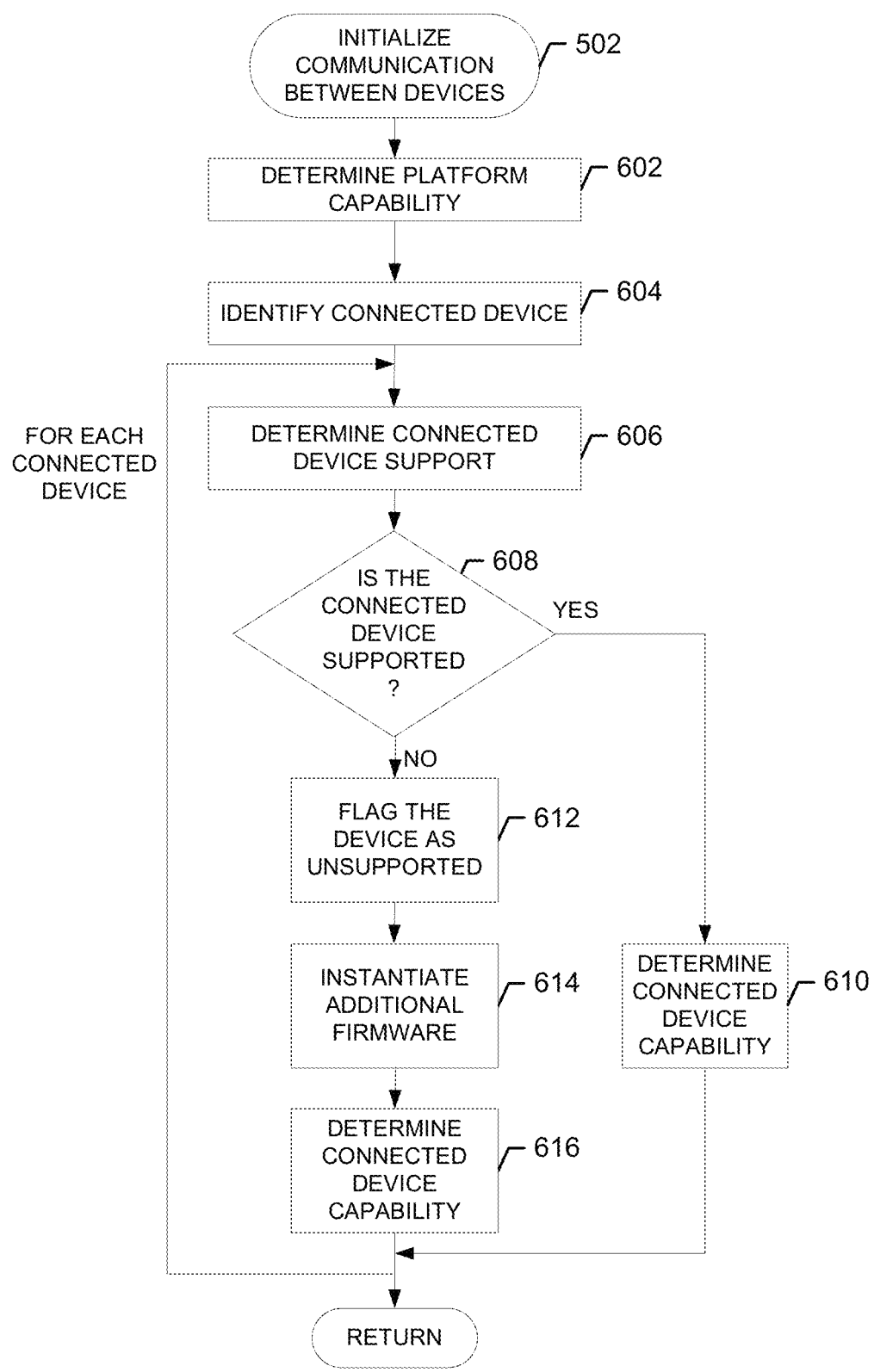

Additional detail associated with the initialization of communication between electronic devices (block 502) is shown in the example of FIG. 6. At block 602, platform capability is determined. For example, a number of connectors supported by the PPM 228 (and/or its components 230, 232) is identified. Notification(s) supported by the PPM 228 (and/or its components 230, 232) can also be identified, for example.

At block 604, device(s) connected to the platform are identified. For example, each secondary device 204*a-b* connected to the electronic device 202 via ports 240, 242 are identified by the PPM 228 (alone or in conjunction with the LPM 234). At block 606, for each device 204*a-b*, the device 204*a-b* is evaluated to determine whether the device 204*a-b* is supported by the UCSI. For example, the PPM 228 and LPM 234 communicate with the selected device 204*a-b* to determine whether the secondary device 204*a-b* acknowledges command(s), responds with appropriate parameter(s), syntax, etc., defined in the UCSI specification. In certain examples, device type can be compared to a set of supported device types to determine if the secondary device 204*a-b* is a supported device under UCSI. If the device 204*a-b* responds appropriately and/or is of a supported type, for example, the secondary device 204*a-b* can be identified as a supported device 204*a*. If not, however, then the secondary device 204*a-b* is an unsupported device 204*b* under UCSI.

At block 608, secondary device 204*a-b* support is evaluated. If the device 204*a-b* has been identified as a supported device, then control progresses to block 610. If the device 204*a-b* has not been identified as a supported device, then control progresses to block 612.

At block 610, capability(-ies) of the supported secondary device 204*a* are determined. For example, power, functionality, device status, additional components, etc., are provided to the PPM 228 (e.g., via the port 240 and LPM 234 controller 236 to the PPM 228 controller 230).

At block 612, if the secondary device 204*b* is unsupported, then a flag, parameter, or mode is set for the device 204*b* to indicate that the device 204*b* is unsupported under the interface specification (e.g., UCSI, etc.). The flag, parameter, or mode activates the device-specific controller 238 of the LPM 234, the device-specific driver 232 of the PPM 228, and the device-specific firmware interface 222 to handle communications to and from the unsupported device 204*b*. In certain examples, the device-specific firmware interface 222, driver 232, and controller 238 are configured for a specific device, type of device, etc., to enable communication outside the interface specification (e.g., UCSI, etc.). Thus, the OPM 216 knows to communicate with the secondary device 204*b* using the device-specific driver 232 and the device-specific controller 238.

At block 614, additional firmware is instantiated based on the flag, parameter, or mode set for the device 204*b*. For example, upon determining that the device 204*b* is not supported by the interface specification, the device-specific firmware interface 222 is instantiated or otherwise enabled along with the device interface opregion 224, device-specific driver 232, and device-specific controller 238. In certain examples, such components are not needed and are not activated if connected device(s) are supported by the interface specification (e.g., UCSI, etc.).

At block 616, capability(-ies) of the unsupported secondary device 204*b* are determined. For example, power, functionality, device status, additional components, etc., are provided to the PPM 228 (e.g., via the port 242 and LPM 234 controller 238 to the PPM 228 controller 232).

The process of blocks 606-616 is repeated for each connected device to determine whether each device 204*a-b* is supported or unsupported. In certain examples, a single device-specific firmware interface 222, device interface opregion 224, device-specific driver 232, and device-specific controller 238 can enable communication with multiple unsupported devices. In other examples, a plurality of device-specific firmware interface 222, device interface opregion 224, device-specific driver 232, and device-specific controller 238 are instantiated to facilitate communication with multiple unsupported devices. After all connected devices have been analyzed and identified, the process returns to the example flow of FIG. 5.

Figure 7:
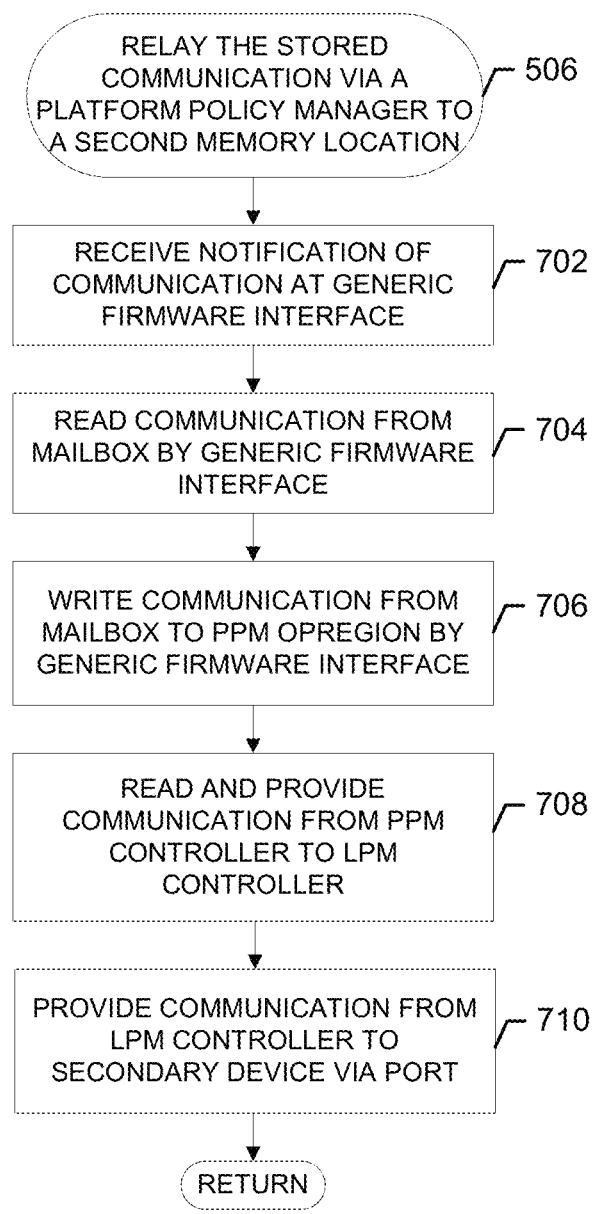

Additional detail associated with the relay of the stored communication to the second memory location (block 506) is shown in the example of FIG. 7. The example of FIG. 7 illustrates the process flow of instructions 506 from the OPM 216 to the secondary device 204*a* executed when the example process 502 of FIG. 5 determines that the secondary device 204*a* is supported. At block 702 in the illustrated example of FIG. 7, the generic firmware interface 218 receives a notification that content has been stored by the OPM 216 in the mailbox 226.

At block 704, the generic firmware interface 218 reads the communication stored in the mailbox 226. For example, the generic firmware interface 218 accesses a specified location in the mailbox 226 to read the message left by the OPM 216. At block 706, the firmware 218 writes the content of the communication from the mailbox 226 to the PPM opregion 220. That is, the firmware 218 reads the communication in the mailbox 226 (the first memory location) and copies it to the opregion 220 (the second memory location) so that the PPM 228 can access the communication. The PPM 228 is unable to access the communication directly from the OPM 216 or its mailbox 226 for security and reliability.

At block 708, the embedded controller 230 of the PPM 228 reads the communication from the opregion 220 and provides the communication to the USB controller 236 of the LPM 234. At block 710, the LPM controller 236 provides the communication to the interface 206*a* of the secondary device 204*a* via the USB port 240. Control then returns to the process 500 of FIG. 5. In certain examples, communications can operate in reverse of the above method 700 (e.g., transmitting a communication from the secondary device 204*a* to the OPM 216) as well.

Figure 8:
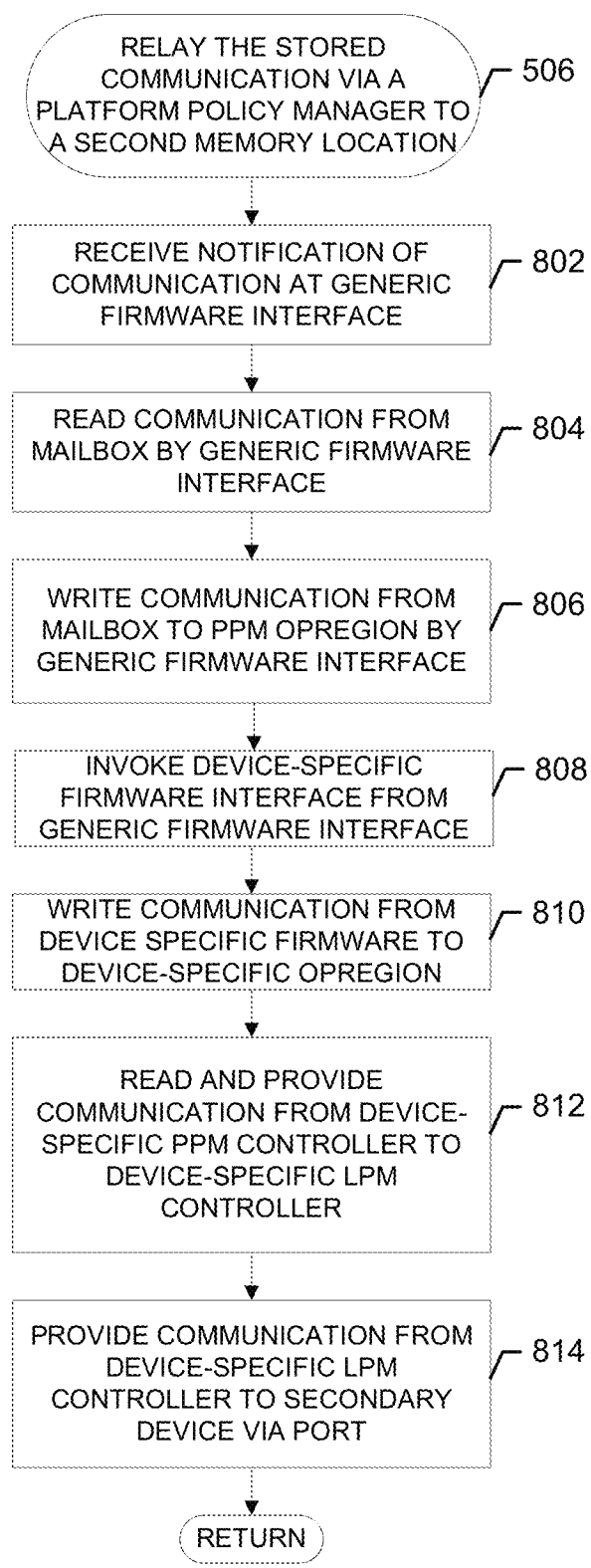

Additional detail associated with the relay of the stored communication to the second memory location (block 506) is shown in the example of FIG. 8. The example of FIG. 8 illustrates the process flow of instructions 506 from the OPM 216 to the secondary device 204*b* executed when the example process 502 of FIG. 5 determines that the secondary device 204*b* is unsupported. At block 802 in the illustrated example of FIG. 8, the generic firmware interface 218 receives a notification that content has been stored by the OPM 216 in the mailbox 226.

At block 804, the generic firmware interface 218 reads the communication stored in the mailbox 226. For example, the generic firmware interface 218 accesses a specified location in the mailbox 226 to read the message left by the OPM 216. At block 806, the generic firmware interface 218 writes the content of the communication from the mailbox 226 to the PPM opregion 220. That is, the firmware 218 reads the communication in the mailbox 226 (the first memory location) and copies it to the opregion 220 (the second memory location) so that the PPM 228 can access the communication.

At block 808, the generic firmware interface 818 invokes the device-specific firmware interface 222 based on the flag, parameter, or mode identifying that the device 204b is not supported by the interface specification from block 612 of the example method 600 of FIG. 6. The additional, device-specific firmware interface 222 is activated to facilitate communication with the unsupported secondary device 204b.

At block 810, the communication is written by the device-specific firmware interface 222 to the device-specific opregion 224. As described above, since communications are segregated between components and the opregions 220, 224, the communication is written to the device-specific opregion 224 to allow the device-specific PPM driver 232 to access the communication even though the device 204b is unsupported under the UCSI specification.

At block 812, the device-specific driver 232 of the PPM 228 reads the communication from the opregion 224 and provides the communication to the device-specific controller 238 of the LPM 234. At block 814, the device-specific LPM controller 238 provides the communication to the interface 206b of the secondary device 204b via the USB port 242. Control then returns to the process 500 of FIG. 5. In certain examples, communications can operate in reverse of the above method 800 (e.g., transmitting a communication from the secondary device 204b to the OPM 216) as well.

Figure 9:
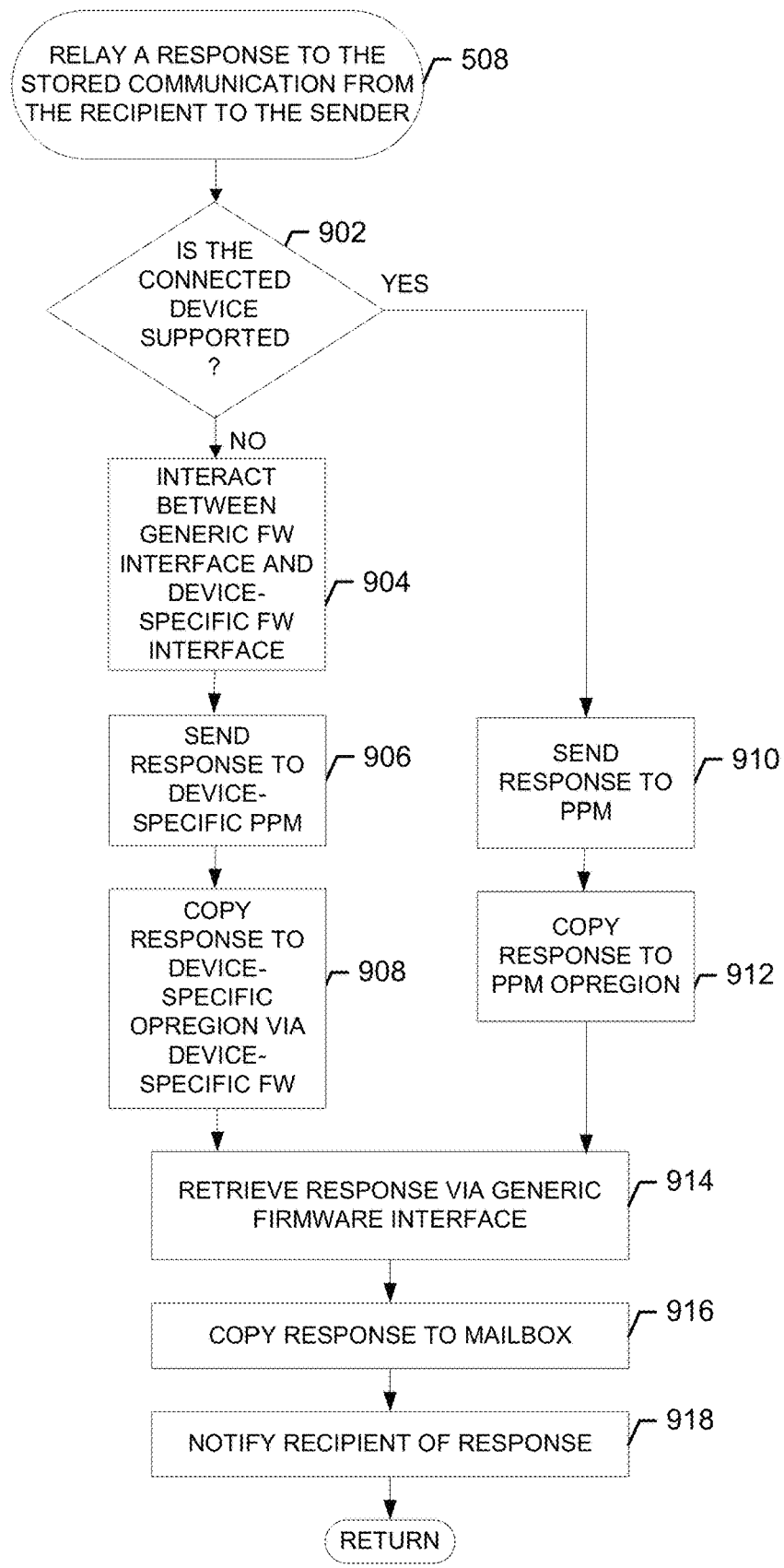

Additional detail associated with the relay of a response to the stored communication from the recipient to the sender (block 508) is shown in the example of FIG. 9. The example of FIG. 9 illustrates an example in which a connected device 204a-b responds to a communication from the OPM 216. At block 902, the connected device 204a-b is evaluated to determine whether the device is supported or not.

As described above with respect to FIG. 6, if the device 204b is unsupported (e.g., a flag, parameter, or mode has been set indicating that the device 204b is unsupported by the interface specification, etc.), then, at block 904, the generic firmware interface 218 interacts with the device-specific FW interface 222 regarding the communication (e.g., the embedded controller 230 communicates with the generic FW interface 218, which communicates with the device-specific FW interface 222 regarding the communication). At block 906, a response to the communication is sent to the device-specific PPM 232 (e.g., via the port 242 and device-specific LPM controller 238 and/or via the device-specific FW interface 222). At block 908, the device-specific PPM driver 232 copies the response to the device-specific interface opregion 224.

If the device 204a is supported, then, at block 910, a response to the communication is sent to the general PPM controller 230 (e.g., via the port 240 and LPM controller 236). At block 912, the PPM controller 230 copies the response to the PPM opregion 220.

At block 914, the generic firmware interface 218 retrieves the response from the opregion 220 and/or 224. If the device 204a is supported, the generic firmware interface 218 retrieves the response from the PPM opregion 220. If the device 204b is unsupported, the device-specific firmware interface 222 retrieves the response from the device-specific interface opregion 224 and provides the response to the generic firmware interface 218.

At block 916, the generic firmware interface 218 copies the response to the mailbox 226. At block 918, the recipient is notified that the response is in the mailbox 226. For example, the generic FW interface 218 notifies the OPM 216 that the response to the communication is saved in the mailbox 226. The OPM 216 can then retrieve and process, if appropriate, the response from the mailbox 226. Control then returns to the process 500 of the example of FIG. 5. In certain examples, communications can operate in reverse of the above method 900 (e.g., transmitting a response from the OPM 216 back to connected secondary device 204a and/or 204b) as well.

Figure 10:
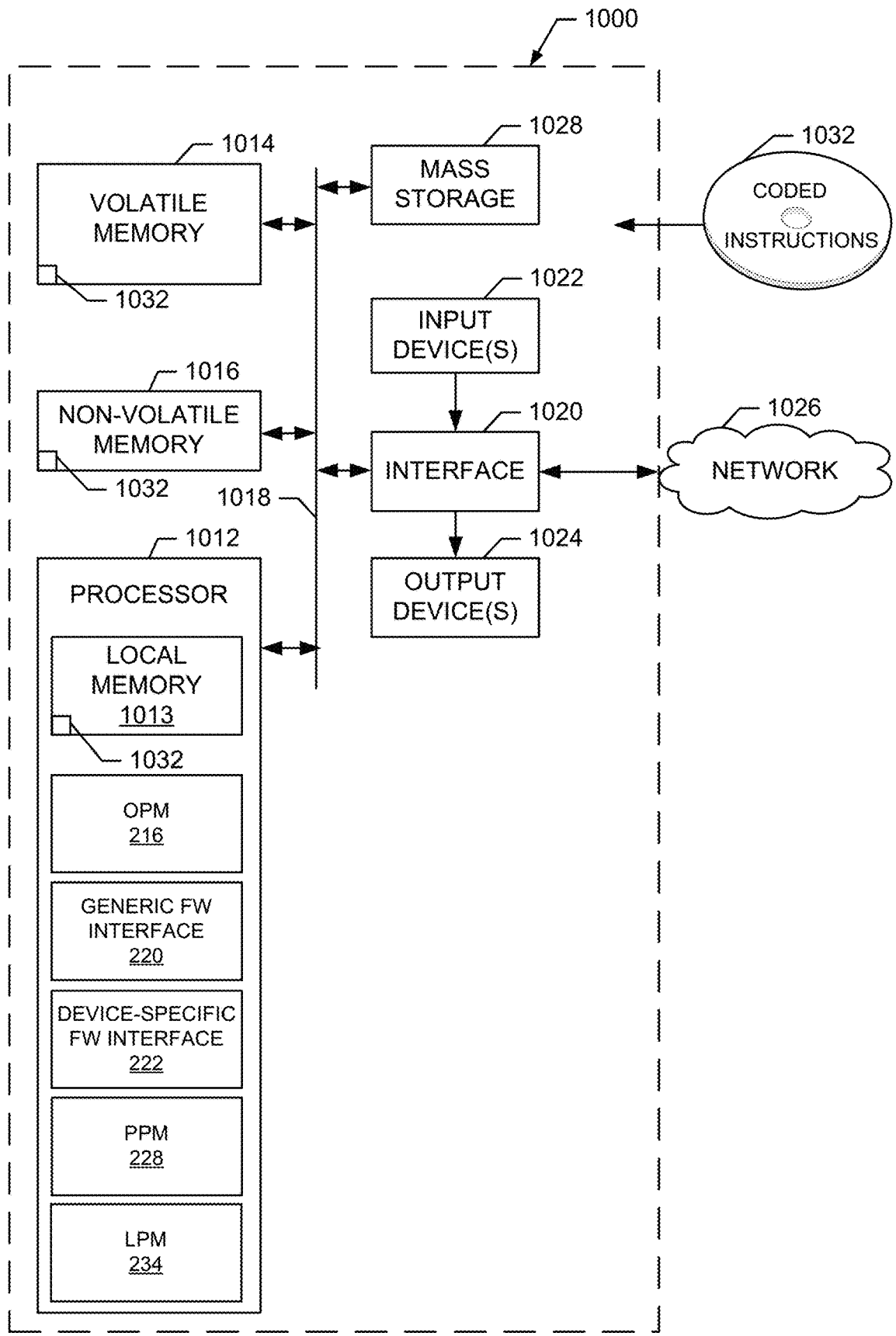
FIG. 10 is a schematic illustration of an example processor platform that may execute the instructions of FIGS. 5-9 to implement the example systems of FIGS. 1-4.

FIG. 10 is a block diagram of an example processor platform 1000 capable of executing the instructions of FIGS. 5-9 to implement the systems of FIGS. 1-4. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. In the illustrated example, the processor 1012 implements the example processor 212 (and/or processor 112) and is structured to include the example OPM 216 (and/or OPM 116), the example generic firmware interface 218 (and/or firmware 118), the example device-specific firmware interface 222, the example PPM 228 (and/or PPM 122), and the example LPM 234 (and/or LPM 124a-d).

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a peripheral component interconnect (PCI) express interface.

In the illustrated example, one or more input devices 1022 are connected to the interface circuit 1020. The input device(s) 1022 permit(s) a user to enter data and commands into the processor 1012. The input device(s) 1022 can be implemented by, for example, an audio sensor, a microphone, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device). The interface circuit 1020 of the illustrated example, thus, typically includes a graphics driver card, a graphics driver chip or a graphics driver processor.

In certain examples, the interface circuit 1020 and its I/O devices 1022, 1024 can be used to implement and/or otherwise include the USB Type-C™ ports 240, 242 (and/or multimodal interfaces 126a-d) described above.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 5-9 may be stored in the mass storage device 1028, in processor memory 1013, in the volatile memory 1014, in the non-volatile memory 1016, and/or on a removable tangible computer readable storage medium such as a CD or DVD. In certain examples, the memory 114, 214, mailbox 128, 226, operating system 110, 210, opregion 120, 220, 224, etc., can be implemented via one or more of the memory/storage 1013, 1014, 1016, 1028.

From the foregoing, it will be appreciated that the above disclosed methods, apparatus and articles of manufacture facilitate data communication with a plurality of electronic devices, whether or not those devices are supported according to a given communication interface specification, such as UCSI. Examples disclosed herein facilitate instantiation of a device-specific firmware interface and a device-specific operating region in memory to accommodate communication with unsupported devices that remains separate from but work with a primary path for communication with supported devices through a general firmware interface, operating region, and platform policy management.

Examples disclosed herein initialize communication with one or more connected secondary devices and set a mode based on whether or not the device is supported by the interface specification (e.g., upon OS startup, identify and initiate communication with USB-C™ devices, Thunderbolt™ devices, etc.). Communication proceeds differently depending upon the mode (e.g., depending upon whether or not the device is supported), with device-specific controllers acting as intermediaries for device communications unsupported by the primary controllers such that all devices can communicate with an operating system policy manager to exchange commands and other information.

Example 1 is an apparatus including a first firmware interface to facilitate communication between an operating system and a first electronic device in electronic connection with the apparatus via a communication port. In example 1, the first electronic device is supported in an interface specification. Example 1 includes a second firmware interface instantiated to facilitate communication with a second electronic device that is not supported in the interface specification. In example 1, the second firmware interface is configured to communicate with the first firmware interface to route communication between the operating system and the second electronic device via the first firmware interface and the second firmware interface Example 2 includes the subject matter of example 1, further including a platform policy manager to maintain platform information for the first and second electronic devices. The platform policy manager of example 2 includes a) a controller to facilitate communication between the first electronic device and the operating system via the first firmware interface and b) a device-specific driver to facilitate communication between the second electronic device and the operating system via the second firmware interface.

Example 3 includes the subject matter of example 2, further including a local platform policy manager including a first controller and a second controller. The first controller of example 3 is to manage a first interface to connect the apparatus to the first electronic device, and the second controller is to manage a second interface to connect the apparatus to the second electronic device.

Example 4 includes the subject matter of example 2, wherein the platform policy manager associates the first electronic device with a first mode and the second electronic device with a second mode, and wherein designation of the second mode triggers instantiation of the second firmware interface.

Example 5 includes the subject matter of example 1, further including a mailbox to store messages to and from the operating system, the mailbox formed from a region of memory.

Example 6 includes the subject matter of example 5, wherein the first firmware interface is configured to access the mailbox.

Example 7 includes the subject matter of example 1, wherein the second firmware interface is configured to route communication from the second electronic device to the operating system through the first firmware interface, and wherein the first firmware interface is configured to route communication to the second electronic device from the operating system through the second firmware interface.

Example 8 includes the subject matter of example 1, further including an operating system policy manager to facilitate interaction between the operating system and hardware of the apparatus.

Example 9 includes the subject matter of example 1, wherein the first firmware interface configured to write to a first operating region of memory and the second firmware interface is configured to write to a second operating region of memory.

Example 10 includes the subject matter of example 1, wherein the interface specification includes USB Type-C™ system software interface specification.

Example 11 is a method including detecting a first electronic device; and enabling, when the first electronic device is not supported in an interface specification, a first firmware interface. The first firmware interface of example 11 is to operate in conjunction with a second firmware interface to facilitate communication between an operating system and the first electronic device. In example 11, communication between the operating system and a second electronic device, the second electronic device supported in the interface specification, is to be facilitated by the second firmware interface.

Example 12 includes the subject matter of example 11, further including associating a first operating region for writing by the first firmware interface and associating a second operating region for writing by the second firmware interface.

Example 13 includes the subject matter of example 11, further including maintaining platform information for the first and second electronic devices using a platform policy manager. In example 13, the platform policy manager includes a) a controller to facilitate communication between the first electronic device and the operating system via the first firmware interface and b) a device-specific driver to facilitate communication between the second electronic device and the operating system via the second firmware interface.

Example 14 includes the subject matter of example 13, further including associating, using the platform policy manager, the first electronic device with a first mode; and associating, using the platform policy manager, the second electronic device with a second mode, wherein designation of the first mode triggers instantiation of the first firmware interface.

Example 15 includes the subject matter of example 13, further including managing, via a local platform policy manager, a first interface and a second interface to connect the first electronic device and the second electronic device, respectively, to the platform policy manager. In example 15, the first controller is to manage a first interface to connect the first electronic device to the device-specific driver of the platform policy manager, and the second controller is to manage a second interface to connect the second electronic device to the controller of the platform policy manager.

Example 16 includes the subject matter of example 11, further including storing a message between the operating system and the first electronic device in a mailbox, the mailbox to be accessed by the operating system and the second firmware interface.

Example 17 includes the subject matter of example 11, further including routing communication from the first electronic device to the operating system through the first firmware interface and the second firmware interface; and routing communication from the second electronic device from the operating system through the second firmware interface.

Example 18 includes the subject matter of example 11, further including facilitating interaction between the operating system and the second firmware interface via an operating system policy manager.

Example 19 includes the subject matter of example 11, further including synchronizing the first firmware interface and the second firmware interface using a counter to order communications between the first electronic device and the second electronic device and the operating system.

Example 20 includes the subject matter of example 11, wherein the interface specification includes USB Type-C™ system software interface specification.

Example 21 is at least one tangible computer readable storage medium comprising computer readable instructions which, when executed, cause a processor to at least detect a first electronic device. In example 21, the instructions, when executed, cause the processor to at least enable, when the first electronic device is not supported in an interface specification, a first firmware interface, the first firmware interface to operate in conjunction with a second firmware interface to facilitate communication between an operating system and the first electronic device. In example 21, communication between the operating system and a second electronic device, the second electronic device supported in the interface specification, is to be facilitated by the second firmware interface.

Example 22 includes the subject matter of example 21, wherein the instructions, when executed, further cause the processor to associate a first operating region for writing by the first firmware interface and associating a second operating region for writing by the second firmware interface.

Example 23 includes the subject matter of example 21, wherein the instructions, when executed, further cause the processor to maintain platform information for the first and second electronic devices using a platform policy manager. In example 23, the platform policy manager includes a) a controller to facilitate communication between the first electronic device and the operating system via the first firmware interface and b) a device-specific driver to facilitate communication between the second electronic device and the operating system via the second firmware interface.

Example 24 includes the subject matter of example 23, wherein the instructions, when executed, further cause the processor to associate, using the platform policy manager, the first electronic device with a first mode; and associate, using the platform policy manager, the second electronic device with a second mode. In example 24, designation of the first mode triggers instantiation of the first firmware interface.

Example 25 includes the subject matter of example 23, wherein the instructions, when executed, further cause the processor to manage, via a local platform policy manager, a first interface and a second interface to connect the first electronic device and the second electronic device, respectively, to the platform policy manager. In example 25, the first controller is to manage a first interface to connect the first electronic device to the device-specific driver of the platform policy manager, and the second controller is to manage a second interface to connect the second electronic device to the controller of the platform policy manager.

Example 26 includes the subject matter of example 21, wherein the instructions, when executed, further cause the processor to store a message between the operating system and the first electronic device in a mailbox, the mailbox to be accessed by the operating system and the second firmware interface.

Example 27 includes the subject matter of example 21, wherein the instructions, when executed, further cause the processor to route communication from the first electronic device to the operating system through the first firmware interface and the second firmware interface; and route communication from the second electronic device from the operating system through the second firmware interface.

Example 28 includes the subject matter of example 21, wherein the instructions, when executed, further cause the processor to facilitate interaction between the operating system and the second firmware interface via an operating system policy manager.

Example 29 includes the subject matter of example 21, wherein the instructions, when executed, further cause the processor to synchronize the first firmware interface and the second firmware interface using a counter to order communications between the first electronic device and the second electronic device and the operating system.

Example 30 includes the subject matter of example 21, wherein the interface specification includes USB Type-C™ system software interface specification.

Example 32 is a device including a means for detecting a first electronic device; and a means for enabling, when the first electronic device is not supported in an interface specification, a first firmware interface, the first firmware interface to operate in conjunction with a second firmware interface to facilitate communication between an operating system and the first electronic device, wherein communication between the operating system and a second electronic device, the second electronic device supported in the interface specification, is to be facilitated by the second firmware interface.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a first firmware interface to abstract underlying hardware and facilitate communication between an operating system and a first electronic device for which communication is defined in an interface specification, the interface specification defining commands and a communication protocol for communication between the operating system and the first electronic device via the first firmware interface;
   a second firmware interface instantiated to facilitate communication with a second electronic device for which communication is not defined in the interface specification, the second firmware interface defined for a type of the second electronic device and configured to communicate with the first firmware interface and a device-specific driver to route communication between the operating system and the second electronic device via the first firmware interface and the second firmware interface, the device-specific driver defined for the type of the second electronic device to process commands between the operating system and the second electronic device; and
   a platform policy manager to maintain platform information for the first and second electronic devices, the platform policy manager to communicate with a) a controller to facilitate communication between the first electronic device and the operating system via the first firmware interface and b) the device-specific driver to facilitate communication between the second electronic device and the operating system via the second firmware interface.

2. The apparatus of claim 1, further including a local platform policy manager including a first controller and a second controller, the first controller to manage a first interface to connect the apparatus to the first electronic device, and the second controller to manage a second interface to connect the apparatus to the second electronic device.

3. The apparatus of claim 1, wherein the platform policy manager associates the first electronic device with a first mode and the second electronic device with a second mode, wherein designation of the second mode triggers instantiation of the second firmware interface.

4. The apparatus of claim 1, further including a mailbox to store messages to and from the operating system, the mailbox formed from a region of memory.

5. The apparatus of claim 4, wherein the first firmware interface is configured to access the mailbox.

6. The apparatus of claim 1, wherein the second firmware interface is configured to route communication from the second electronic device to the operating system through the first firmware interface, and wherein the first firmware interface is configured to route communication to the second electronic device from the operating system through the second firmware interface.

7. The apparatus of claim 1, further including an operating system policy manager to facilitate interaction between the operating system and hardware of the apparatus.

8. The apparatus of claim 1, wherein the first firmware interface is configured to write to a first operating region of memory and the second firmware interface is configured to write to a second operating region of memory.

9. The apparatus of claim 1, wherein the interface specification includes USB Type-C™ system software interface specification.

10. A method comprising:
    detecting a first electronic device;
    enabling, when communication with the first electronic device is not defined in an interface specification, a first firmware interface defined for a type of the first electronic device, the first firmware interface to operate in conjunction with a second firmware interface and a device-specific driver to facilitate communication between an operating system and the first electronic device, the device-specific driver defined for the type of the first electronic device to process commands between the operating system and the first electronic device;
    facilitating communication between the operating system and a second electronic device, wherein communication with the second electronic device is defined in the interface specification, by the second firmware interface without the first firmware interface, the interface specification defining commands and a communication protocol for communication between the operating system and the second electronic device via the second firmware interface; and
    maintaining platform information for the first and second electronic devices using a platform policy manager, the platform policy manager to communicate with a) a controller to facilitate communication between the second electronic device and the operating system via the second firmware interface and b) the device-specific driver to facilitate communication between the first electronic device and the operating system via the first firmware interface.

11. The method of claim 10, further including:
    associating a first operating region for writing by the first firmware interface and associating a second operating region for writing by the second firmware interface.

12. The method of claim 10, further including:
    associating, using the platform policy manager, the first electronic device with a first mode; and
    associating, using the platform policy manager, the second electronic device with a second mode,
    wherein designation of the first mode triggers instantiation of the first firmware interface.

13. The method of claim 10, further including:
    managing, via a local platform policy manager, a first interface and a second interface to connect the first electronic device and the second electronic device, respectively, to the platform policy manager, the first controller to manage a first interface to connect the first electronic device to the device-specific driver of the platform policy manager, and the second controller to manage a second interface to connect the second electronic device to the controller of the platform policy manager.

14. The method of claim 10, further including:
    storing a message between the operating system and the first electronic device in a mailbox, the mailbox to be accessed by the operating system and the second firmware interface.

15. The method of claim 10, further including:
    routing communication from the first electronic device to the operating system through the first firmware interface and the second firmware interface; and routing communication from the second electronic device from the operating system through the second firmware interface.

16. The method of claim 10, further including:
facilitating interaction between the operating system and the second firmware interface via an operating system policy manager.

17. The method of claim 10, wherein the interface specification includes USB Type-C™ system software interface specification.

18. At least one tangible computer readable storage medium comprising computer readable instructions which, when executed, cause a processor to at least:
detect a first electronic device;
enable, when communication with the first electronic device is not defined in an interface specification, a first firmware interface defined for a type of the first electronic device, the first firmware interface to operate in conjunction with a second firmware interface and a device-specific driver to facilitate communication between an operating system and the first electronic device, the device-specific driver defined for the type of the first electronic device to process commands between the operating system and the first electronic device;
facilitate communication between the operating system and a second electronic device, wherein communication with the second electronic device is defined in the interface specification, by the second firmware interface without the first firmware interface, the interface specification defining commands and a communication protocol for communication between the operating system and the second electronic device via the second firmware interface; and
maintain platform information for the first and second electronic devices using a platform policy manager, the platform policy manager to communicate with a) a controller to facilitate communication between the second electronic device and the operating system via the second firmware interface and b) the device-specific driver to facilitate communication between the first electronic device and the operating system via the first firmware interface.

19. The at least one computer readable storage medium of claim 18, wherein the instructions, when executed, further cause the processor to:
associate a first operating region for writing by the first firmware interface and associating a second operating region for writing by the second firmware interface.

20. The at least one computer readable storage medium of claim 18, wherein the instructions, when executed, further cause the processor to:
associate, using the platform policy manager, the first electronic device with a first mode; and
associate, using the platform policy manager, the second electronic device with a second mode,
wherein designation of the first mode triggers instantiation of the first firmware interface.

21. The at least one computer readable storage medium of claim 18, wherein the instructions, when executed, further cause the processor to:
manage, via a local platform policy manager, a first interface and a second interface to connect the first electronic device and the second electronic device, respectively, to the platform policy manager, the first interface to connect the first electronic device to the device-specific driver of the platform policy manager, and the second interface to connect the second electronic device to the controller of the platform policy manager.

22. The at least one computer readable storage medium of claim 18, wherein the instructions, when executed, further cause the processor to:
store a message between the operating system and the first electronic device in a mailbox, the mailbox to be accessed by the operating system and the second firmware interface.

23. The at least one computer readable storage medium of claim 18, wherein the instructions, when executed, further cause the processor to:
route communication from the first electronic device to the operating system through the first firmware interface and the second firmware interface; and
route communication from the second electronic device from the operating system through the second firmware interface.

24. The at least one computer readable storage medium of claim 18, wherein the instructions, when executed, further cause the processor to:
facilitate interaction between the operating system and the second firmware interface via an operating system policy manager.

25. The at least one computer readable storage medium of claim 18, wherein the instructions, when executed, further cause the processor to:
synchronize the first firmware interface and the second firmware interface using a counter to order communications between the first electronic device and the second electronic device and the operating system.

26. The at least one computer readable storage medium of claim 18, wherein the interface specification includes USB Type-C™ system software interface specification.

* * * * *